(12) United States Patent
Aros et al.

(10) Patent No.: US 12,553,638 B2
(45) Date of Patent: Feb. 17, 2026

(54) DETERMINING ROTATION USING SENSOR DISPLACED FROM MAGNET

(71) Applicant: RESIDEO LLC, Golden Valley, MN (US)

(72) Inventors: Luis Antonio Aros, Golden Valley, MN (US); Raul Antonio Rascon Perez, Golden Valley, MN (US)

(73) Assignee: RESIDEO LLC, Golden Valley, MN (US)

( * ) Notice: Subject to any disclaimer, the term of this patent is extended or adjusted under 35 U.S.C. 154(b) by 313 days.

(21) Appl. No.: 18/000,481

(22) PCT Filed: Jun. 4, 2021

(86) PCT No.: PCT/US2021/035908
§ 371 (c)(1),
(2) Date: Dec. 1, 2022

(87) PCT Pub. No.: WO2021/248002
PCT Pub. Date: Dec. 9, 2021

(65) Prior Publication Data
US 2023/0221033 A1 Jul. 13, 2023

Related U.S. Application Data

(60) Provisional application No. 63/035,411, filed on Jun. 5, 2020.

(51) Int. Cl.
*F24F 11/88* (2018.01)
*F24F 11/50* (2018.01)
(Continued)

(52) U.S. Cl.
CPC .............. *F24F 11/88* (2018.01); *F24F 11/50* (2018.01); *G01B 7/30* (2013.01); *G01D 5/145* (2013.01); *G05D 23/1902* (2013.01)

(58) Field of Classification Search
CPC .. F24F 11/88; F24F 11/50; G01B 7/30; G01D 5/145
See application file for complete search history.

(56) References Cited

U.S. PATENT DOCUMENTS 6,437,529 B1 * 8/2002 Brown ................... H02K 16/04
318/400.26
2005/0279841 A1 12/2005 Schwendinger et al.
(Continued)

OTHER PUBLICATIONS

International Search Report and Written Opinion in PCT International Application No. PCT/US2021/035908 mailed Sep. 15, 2021.

*Primary Examiner* — Mohammad Ali
*Assistant Examiner* — Vincent W Chang
(74) *Attorney, Agent, or Firm* — Greenberg Traurig, LLP; Ryan D. Sharp; David J. Dykeman

(57) ABSTRACT

A device may be configured to control a heating, ventilation, and air conditioning (HVAC) system within a building. The device includes a rotatable dial comprising a first gear; a second gear configured to engage with the first gear, wherein a rotation of the first gear causes the second gear to rotate; a magnet placed on the second gear, wherein the magnet rotates with the second gear; a sensor configured to generate an electrical signal which indicates a rotational position of the magnet, wherein the rotational position of the magnet indicates the rotational position of the second gear; and processing circuitry. The processing circuitry is configured to receive, from the sensor, the electrical signal which indicates the rotational position of the second gear; and change a temperature set point based on a change in the rotational position of the second gear.

16 Claims, 7 Drawing Sheets

(51) Int. Cl.
   *G01B 7/30*     (2006.01)
   *G01D 5/14*     (2006.01)
   *G05D 23/19*    (2006.01)

(56) References Cited

U.S. PATENT DOCUMENTS

| | | | |
|---|---|---|---|
| 2007/0273313 A1* | 11/2007 | Ikeda | B60S 1/08 |
| | | | 318/282 |
| 2011/0309827 A1* | 12/2011 | Ruebenhagen | G01D 5/04 |
| | | | 324/207.25 |
| 2013/0104844 A1* | 5/2013 | Noh | F02D 11/106 |
| | | | 123/403 |
| 2015/0163631 A1 | 6/2015 | Quam et al. | |
| 2017/0278383 A1 | 9/2017 | Dimberg et al. | |
| 2019/0016370 A1* | 1/2019 | Hwang | B62D 5/008 |
| 2019/0218824 A1* | 7/2019 | Ainley | G01B 7/003 |
| 2020/0084866 A1 | 3/2020 | Bard et al. | |
| 2021/0207837 A1* | 7/2021 | Diaz | F24F 11/523 |
| 2023/0003409 A1* | 1/2023 | Romero | G05G 1/08 |

* cited by examiner

DETERMINING ROTATION USING SENSOR DISPLACED FROM MAGNET

CROSS-REFERENCE TO RELATED APPLICATIONS

This application is a U.S. National Phase patent application under 35 U.S.C. 371 of International Application No. PCT/US2021/035908 filed Jun. 4, 2021, which claims the benefit of and priority to U.S. Provisional Patent Application No. 63/035,411, filed on Jun. 5, 2020, the entire contents of each of which are incorporated herein by reference in their entireties.

TECHNICAL FIELD

The disclosure relates to heating, ventilation, and air condition (HVAC) systems and thermostats for buildings.

BACKGROUND

A heating, ventilation, and air conditioning (HVAC) controller can control a variety of devices such as a furnace, a heat pump including a geothermal heat pump, a boiler, air conditioning unit, forced air circulation, and other similar equipment to control the internal climate conditions of a building. In some examples, a thermostat can control different devices depending on the outside temperature, temperature inside the building, the time of day, and other factors.

SUMMARY

In general, the disclosure is directed to a heating, ventilation, and air conditioning (HVAC) controller which is configured to regulate one or more aspects of an environment of an area. For example, the HVAC controller may be configured to regulate a temperature based on a set point temperature. In some examples, the HVAC controller includes a dial and the HVAC controller may change the set point temperature based on a rotation of the dial. The dial may rotate in response to a user input. It may be beneficial for the HVAC controller to determine an absolute rotational position of the dial over time so the HVAC controller may control one or more parameters based on a rotation of the dial. The HVAC controller includes a Hall effect sensor and a magnet, where the magnet is located on a gear which rotates in response to a rotation on the dial. By determining an absolute rotational position of the magnet using the Hall effect sensor, it is possible to precisely determine an absolute rotational position of the dial over time. This allows the HVAC controller to control one or more parameters based on the rotational position of the dial over time.

It may be beneficial for the HVAC controller to track a rotation of the dial using components (e.g., a magnet and a Hall effect sensor) which easily fit within a housing of the HVAC controller. A magnet including a signal pair of poles may fit within the housing of the HVAC controller more easily than a magnet which includes more than one pair of poles, because a magnet including more than one pair of poles may be larger than a magnet which includes a single pair of poles. Additionally, a configuration of the Hall effect sensor and the magnet in which the Hall effect sensor is displaced from the magnet may more easily fit within the housing of HVAC controller as compared with an example HVAC controller in which a Hall effect sensor is located on or within a magnet. One or more techniques described herein may allow processing circuitry to determine an absolute rotational position of the magnet located in the HVAC controller based on electrical signals generated by a Hall effect sensor, where the electrical signals indicate an absolute rotational position of a magnet which includes a single pair of poles. The HVAC controller may track the rotational position of the magnet over time in order to monitor a total rotation of the magnet, and control one or more parameters based on the total rotation of the magnet.

In some examples, a device for controlling one or more heating, ventilation, and air conditioning (HVAC) components includes: a first rotatable part; a second rotatable part configured to engage with the first rotatable part, wherein a rotation of the first rotatable part causes the second rotatable part to rotate; a magnet located on the second rotatable part, wherein the magnet rotates with the second rotatable part; a sensor configured to generate an electrical signal which indicates a rotational position of the magnet; and processing circuitry. The processing circuitry is configured to: receive, from the sensor, the electrical signal which indicates the rotational position of the magnet; and change one or more parameters based on a change in the rotational position of the magnet.

In some examples, a method for controlling one or more heating, ventilation, and air conditioning (HVAC) components comprises generating, by a sensor of a device configured to control the one or more HVAC components, an electrical signal which indicates the rotational position of a magnet, wherein the device comprises: a first rotatable part; a second rotatable part configured to engage with the first rotatable part, wherein a rotation of the first rotatable part causes the second rotatable part to rotate; the magnet located on the second rotatable part, wherein the magnet rotates with the second rotatable part; the sensor; and processing circuitry. Additionally, the method includes receiving, by the processing circuitry from the sensor, the electrical signal which indicates the rotational position of the magnet; and changing, by the processing circuitry, one or more parameters based on a change in the rotational position of the magnet.

In some examples, a system includes a device comprising: a first rotatable part; a second rotatable part configured to engage with the first rotatable part, wherein a rotation of the first rotatable part causes the second rotatable part to rotate; a magnet located on the second rotatable part, wherein the magnet rotates with the second rotatable part; a sensor configured to generate an electrical signal which indicates a rotational position of the magnet; and processing circuitry. The processing circuitry is configured to receive, from the sensor, the electrical signal which indicates the rotational position of the magnet; and change one or more parameters based on a change in the rotational position of the magnet. The system further comprises one or more heating, ventilation, and air conditioning (HVAC) components configured to regulate an environment in an area of a building based on the one or more parameters.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
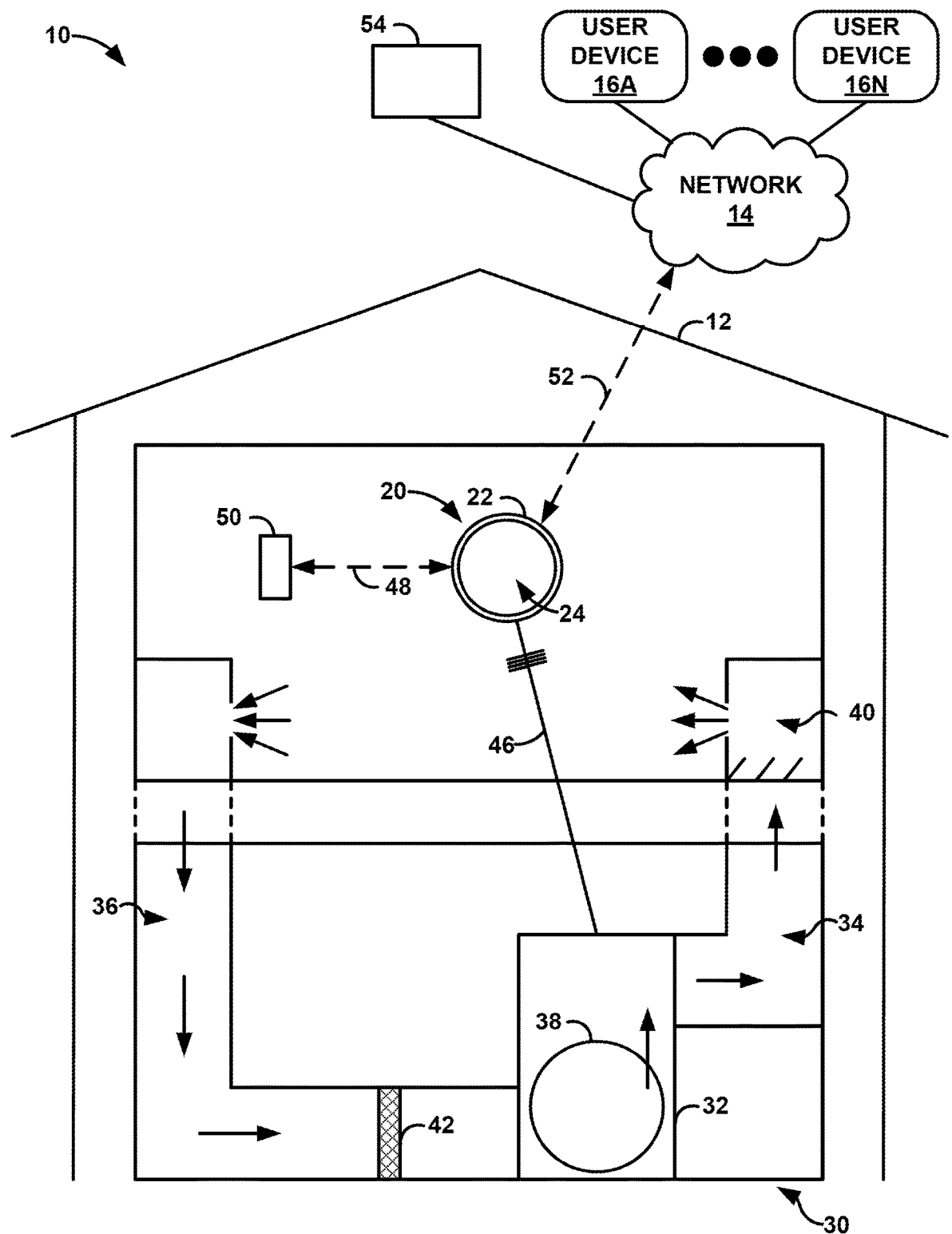
FIG. 1 is a block diagram illustrating an example system including a heating, ventilation, and air conditioning (HVAC) controller configured to control an HVAC system in a building, in accordance with one or more techniques described herein.

FIG. 1 is a block diagram illustrating an example system 10 including a heating, ventilation, and air conditioning (HVAC) controller 20 configured to control an HVAC system 30 in a building 12, in accordance with one or more techniques described herein. HVAC system 30 includes HVAC component 32, a system of ductwork and air vents including supply air duct 34 and a return air duct 36, and HVAC controller 20. HVAC component 32 may include, but is not limited to, a furnace, a heat pump, an electric heat pump, a geothermal heat pump, an electric heating unit, an air conditioning (AC) unit, a humidifier, a dehumidifier, an air exchanger, an air cleaner, a damper, a valve, a fan, and/or another device.

HVAC controller 20 may be configured to control the comfort level (e.g., temperature and/or humidity) in building 12 by activating and deactivating HVAC component 32 in a controlled manner. HVAC controller 20 may be configured to control HVAC component 32 via a wired or wireless communication link 46. HVAC controller 20 may be a thermostat, such as, for example, a wall mountable thermostat. In some examples, HVAC controller 20 may be programmable to allow for user-defined temperature set points to control the temperature of building 12. Based on sensed temperature of building 12, HVAC controller 20 may turn on or off HVAC component 32 to reach the user-defined temperature set point. Although this disclosure describes HVAC controller 20 (and controllers shown in other figures) as controlling HVAC component 32 and determining whether an actual configuration includes an irregularity, external computing device 50 may also be configured to perform these functions. The techniques of this disclosure will primarily be described using examples related to temperature, but the systems, devices, and methods described herein may also be used in conjunction with other sensed properties, such as humidity or air quality. In some examples, HVAC controller 20 may be configured to control all of the critical networks of a building, including a security system.

HVAC component 32 may provide heated air (and/or cooled air) via the ductwork throughout the building 12. As illustrated, HVAC component 32 may be in fluid communication with every space, room, and/or zone in building 12 via supply air duct 34 and return air duct 36 (collectively, "ducts 34, 36"), but this is not required. In operation, when HVAC controller 20 provides a heat call signal, HVAC component 32 (e.g. a forced warm air furnace) may turn on (begin operating or activate) to supply heated air to one or more spaces within building 12 via supply air duct 34. HVAC component 32 and blower or fan 38 can force the heated air through supply air duct 34. In this example, cooler air from each space returns to HVAC component 32 (e.g. forced warm air furnace) for heating via return air duct 36. Similarly, when a cool call signal is provided by HVAC controller 20, HVAC component 32 (e.g., an AC unit) may turn on to supply cooled air to one or more spaces within building 12 via supply air duct 34. HVAC component 32 and blower or fan 38 can force the cooled air through supply air duct 34. In this example, warmer air from each space of building 12 may return to HVAC component 32 for cooling via return air duct 36.

The system of ducts 34, 36 can include one or more dampers 40 to regulate the flow of air, but this is not required. For example, one or more dampers 40 may be coupled to HVAC controller 20 and can be coordinated with the operation of HVAC component 32. HVAC controller 20 may actuate dampers 40 to an open position, a closed position, and/or a partially open position to modulate the flow of air from the one or more HVAC components to an appropriate room and/or space in building 12. Dampers 40 may be particularly useful in zoned HVAC systems, and may be used to control which space(s) in building 12 receive conditioned air and/or receives how much conditioned air from HVAC component 32.

In many instances, air filter 42 may be used to remove dust and other pollutants from the air inside building 12. In the example shown in FIG. 1, air filter 42 is installed in return air duct 36 and may filter the air prior to the air entering HVAC component 32, but it is contemplated that any other suitable location for air filter 42 may be used. The presence of air filter 42 may not only improve the indoor air quality but may also protect the HVAC component 32 from dust and other particulate matter that would otherwise be permitted to enter HVAC component 32.

HVAC controller 20 may include any suitable arrangement of hardware, software, firmware, or any combination thereof, to perform the techniques attributed to HVAC controller 20 herein. Examples of HVAC controller 20 include any one or more microprocessors, digital signal processors (DSPs), application specific integrated circuits (ASICs), field programmable gate arrays (FPGAs), or any other equivalent integrated or discrete logic circuitry, as well as any combinations of such components. When HVAC controller 20 includes software or firmware, HVAC controller 20 further includes any necessary hardware for storing and executing the software or firmware, such as one or more processors or processing units. In general, a processing unit may include one or more microprocessors, DSPs, ASICs, FPGAs, or any other equivalent integrated or discrete logic circuitry, as well as any combinations of such components.

Although not shown in FIG. 1, HVAC controller 20 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to HVAC controller 20 (e.g., may be external to a package in which HVAC controller 20 is housed). For example, HVAC controller 20 may be able to store data to and read data from the memory included in external computing device 50 and/or the memory included in external database 54. The memory may be used for storing data such as possible wiring configurations of HVAC controller 20 and network settings such as an Internet Protocol (IP) address and/or a Media Access Control (MAC) address of HVAC controller 20, external computing device 50, and/or a router.

In some examples, HVAC controller 20 may include a dial 22 which is located at an outer circumference of HVAC controller 20. HVAC controller 20 may be fixed to a wall or another surface such that dial 22 may be rotated relative to one or more other components (e.g., display 24) of HVAC controller 20. Dial 22 may represent a user interface such that processing circuitry of HVAC controller 20 may receive, via dial 22, information indicative of a user input. In some examples, the user input may represent a user selection of a set point parameter value (e.g., a set point temperature), a user selection of information to be displayed by HVAC controller 20, or a user selection of another setting or parameter. In some examples, dial 22 includes a set of light-emitting diodes (LEDs), but this is not required. The processing circuitry of HVAC controller 20 may selectively illuminate one or more LEDs of the set of LEDs in order to indicate a set point temperature or convey other information. In some examples, dial 22 may smoothly rotate with respect to display 24. In some examples, dial 22 may rotate with one or more steps such that as dial 22 rotates, dial 22 "snaps" into position after every interval of rotational distance. In some examples, dial 22 may smoothly rotate with respect to display 24 and HVAC controller 20 may output an audio signal (e.g., a clicking noise) for every interval of rotational position (e.g., every one degree) in which dial 22 rotates.

Display 24 may include information relating to one or more aspects of an area in which HVAC controller 20 is located (e.g., a room in which HVAC controller 20 is located, a building in which HVAC controller 20 is located, an area outside of a building in which HVAC controller 20 is located, or any combination thereof). At least a portion of display 24, in some cases, represents an analog display. For example, display 24 may include a set of analog markers which are placed around at least a portion of a circumference of display 24. For example, each marker of the set of markers may extend from an outer circumference of display 24 and towards a center point of display 24. In some examples, the set of analog markers are located such that each analog marker of the set of analog markers is separated by one or more neighboring analog markers of the set of analog markers by a unit of rotational position (e.g., a unit of degrees and/or a unit of radians) For example, analog markers may be located five degrees from neighboring analog markers.

In some examples, each analog marker of the set of analog markers represents a parameter value of a parameter that HVAC controller 20 regulates. For example, the set of analog markers may represent a range of temperatures (e.g., from 40 degrees Fahrenheit (° F.) to 90° F.). In some such examples, the first analog marker of the set of analog markers may represent the lowest temperature of the range of temperatures and the last analog marker of the set of analog markers may represent the highest temperature of the range of temperatures. Display 24 may include a pointer (not illustrated in FIG. 1) connected to an electrical motor. The pointer may extend radially outwards from a center point of HVAC controller 20 and rotate about the center point of HVAC controller 20. As such, the processing circuitry of HVAC controller 20 may be configured to actuate the electrical motor in order to cause the pointer to indicate, or "point at" one or more analog markers of the set of analog markers. In some examples, the processing circuitry may cause the pointer to point at an analog marker of the set of analog markers which corresponds to a current temperature of the area in which HVAC controller 20 is located. For example, the processing circuitry of HVAC controller 20 may receive, from a temperature sensor, a temperature signal indicative of the current temperature of the area in which HVAC controller 20 is located. In some examples, the temperature sensor is located on or within HVAC controller 20. In some examples, the temperature sensor is separate from HVAC controller 20 and communicates with HVAC controller 20 via a wireless connection. The processing circuitry may control, based on the temperature signal, the electrical motor to cause the pointer to point at the analog marker associated with the current temperature.

In some examples, the processing circuitry of HVAC controller 20 may selectively illuminate one or more LEDs of the set of LEDs of dial 22 in order to indicate one or more set point parameter values, such as one or more set point temperature values. In some examples, the set of LEDs may be located within dial 22. In some examples, the set of LEDs may be located adjacent to dial 22. Each analog marker of the set of analog markers may be located at an outer diameter of display 24 (e.g., a farthest location from the center point of display 24), and dial 22 including the set of LEDs may be located at an outer diameter of HVAC controller 20, just beyond the outer diameter of display 24. As such, the processing circuitry of HVAC controller 20 may activate (e.g., illuminate) one or more LEDs proximate to an analog marker of the set of analog markers in order to indicate that a temperature associated with the analog marker is a set point temperature. In some examples, the processing circuitry may receive information indicative of a user selection of a set point temperature from dial circuitry that is electrically connected to dial 22. For example, based on a rotational movement and/or a rotational position of dial 22, the dial circuitry may generate a signal indicative of a user selection of a set point value and output the signal to the processing circuitry. In turn, the processing circuitry may selectively illuminate one or more LEDs of the set of LEDs on dial 22 in order to indicate the selected set point.

Since the pointer may be configured to point at one or more analog markers corresponding to a current temperature of the area in which HVAC controller 20 is located and dial 22 is configured to illuminate one or more LEDs proximate to one or more analog markers corresponding to the set point temperature for the area, display 24 and dial 22 may show the set point temperature and the current temperature using the same set of analog markers. It may be beneficial to display the set point temperature and the current temperature using the same set of analog markers in order to allow a user to more easily visualize a difference between the set point temperature and the current temperature as compared with an HVAC controller which does not show the set point temperature and the current temperature using the same set of analog markers.

In some examples, the processing circuity of HVAC controller 20 may determine whether the set point temperature is greater than the current temperature. If the set point temperature is lower than the current temperature, the processing circuitry of HVAC controller 20 may output a signal to HVAC system 30 in order to cause the temperature in the area proximate HVAC controller 20 to decrease to the set point temperature. In some examples where the set point temperature is lower than the current temperature, HVAC controller 20 may output an instruction to the set of LEDs of dial 22 to output a first optical signal of a first color. In some examples, the first color is blue. If the set point temperature is greater than the current temperature, the processing circuitry of HVAC controller 20 may output a signal to HVAC system 30 in order to cause the temperature in the area proximate HVAC controller 20 to increase to the set point temperature. In some examples where the set point temperature is greater than the current temperature, HVAC controller 20 may output an instruction to the set of LEDs of dial 22 to output a second optical signal of a second color. In some examples, the second color is red.

Although the LEDs of dial 22 are described herein as indicating the set point temperature for the area in which HVAC controller 20 is located, this is not required. In some examples, the set of markers themselves may be illuminated in order to indicate one or more set point parameter values. For example, display 24 may include a set of LEDs configured to selectively illuminate one or more analog markers of the set of analog markers in order to indicate one or more set point parameter values, such as set point temperature values. Additionally, although LEDs of dial 22 are described as emitting optical signals of a first color and a second color based on whether HVAC controller 20 is heating or cooling a space, one or more LEDs of display 24 may additionally or alternatively emit optical signals of a first color and a second color based on whether HVAC controller 20 is heating or cooling a space.

In some examples, at least a portion of display 24 may include a digital display which may permit HVAC controller 20 to display information and/or accept one or more user inputs to HVAC controller 20. In some examples, HVAC controller 20 includes the digital display instead of an analog display or in combination with an analog display. In at least some examples where display 24 includes a digital display, display 24 may include a user interface which may permit a user to input various operating parameters (e.g., temperature set points, humidity set points, fan set points, starting times, ending times, schedule times, diagnostic limits, configuration settings, responses to alerts, and the like) to HVAC controller 20. In some examples, the display may be a physical user interface that is accessible at HVAC controller 20 and may include a display and/or a distinct keypad. Display 24 may include any suitable display. In some examples, display 24 may include, or may be, a liquid crystal display (LCD), and in some cases an e-ink display, fixed segment display, or a dot matrix LCD display. The distinct keypad may include a numerical keypad, system of buttons, control knob, and the like. Additionally, or alternatively, HVAC controller 20 can display information and/or accept user inputs via the user interface of external computing device 50. Thus, a user can interact with HVAC controller 20 through a mobile phone, a tablet, or a computer. For example, user devices 16A-16N (collectively, "user devices 16") may communicate with HVAC controller 20 via network 14.

In some examples, display 24 may include a presence sensitive device to detect user inputs to HVAC controller 20. Example presence-sensitive input displays include a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. Display 24 of HVAC controller 20 may function as an output device using any one or more display devices, such as a liquid crystal display (LCD), dot matrix display, light emitting diode (LED) display, organic light-emitting diode (OLED) display, e-ink, or similar monochrome or color display capable of outputting visible information to a user. The user interface presented by the display of HVAC controller 20 may allow a user to program settings of HVAC controller 20, set temperature zones for building 12, configure desired temperatures for building 12 for different times of the day or days of the week, or other operating parameters. Display 24 of HVAC controller 20 may also be used to present user queries (e.g., what room HVAC controller 20 is installed in, what the address of building 12 is, what HVAC components 32 are connected to HVAC controller 20, etc.). Such queries may aid in installing and/or configuring HVAC controller 20 (e.g. when first connecting HVAC controller 20 to HVAC component 32 of HVAC system 30).

HVAC controller 20 may include a communication device (not illustrated in FIG. 1) to allow HVAC controller 20 to communicate via a wired or wireless connection 48 to one or more external computing devices 50. The communication device may include a Bluetooth transmitter and receiver, a Wi-Fi transmitter and receiver, a Zigbee transceiver, a near-field communication transceiver, or other circuitry configured to allow HVAC controller 20 to communicate with external computing device 50. In some examples, the communication device may allow HVAC controller 20 to exchange data with external computing device 50. Examples of exchanged data include a desired temperature for building 12, HVAC components 32 connected to HVAC controller 20, error codes, geographic location, estimated energy usage and cost, and/or other operating parameters or system performance characteristics for HVAC system 30.

HVAC controller 20 may communicate via wired or wireless connection 48 with external computing device 50. External computing device 50 may be, include, or otherwise be used in combination with a mobile phone, smartphone, tablet computer, personal computer, desktop computer, personal digital assistant, router, modem, remote server or cloud computing device, and/or related device allowing HVAC controller 20 to communicate over a communication network such as, for example, the Internet or other wired or wireless connection. Communicating via the wired or wireless connection 48 may allow HVAC controller 20 to be configured, controlled, or otherwise exchange data with external computing device 50. In some examples, HVAC controller 20 and external computing device 50 communicate through a wireless network device such as a router or a switch. In other examples, HVAC controller 20 and external computing device 50 communicate through a wired connection such as an ethernet port, USB connection, or other wired communication network.

HVAC controller 20 may, via the communication device, communicate via a wired or wireless connection 52 with external database 54. In some examples, wired or wireless connection 52 enables HVAC controller 20 to communicate with external database 54 via a wireless connection which includes a network device such as a router, ethernet port, or switch. HVAC controller 20 and external database 54 may also communicate through a wired connection such as an ethernet port, USB connection, or other wired communication network. Communicating via the wired or wireless connection 52 may allow HVAC controller 20 to exchange data with external database 54. As such, external database 54 may be at a location outside of building 12. In some examples, external database 54 may be, include, or otherwise be used in combination with a remote server, cloud computing device, or network of controllers configured to communicate with each other. For example, HVAC controller 20 may check with HVAC controllers in nearby buildings through the internet or other city- or wide-area network. In some examples, HVAC controller 20 may include an onboard database.

In some examples, external database 54 may be, or otherwise be included in, or accessed via, external computing device 50 (e.g., smartphone, mobile phone, tablet computer, personal computer, etc.). For example, HVAC controller 20 may communicate via a Wi-Fi network connection with a smartphone device to exchange data with external database 54. By communicating via wired or wireless connection 52, HVAC controller 20 may exchange data with external database 54.

In some examples, HVAC controller 20 may display a setpoint as a bright white light at moving around a perimeter of HVAC controller 20. As dial 22 rotates, the light may move with dial 22 to show a selected setpoint. If the setpoint is changed via a mobile application on one or more of user devices 16, the light may move on HVAC controller 20 to show the selected setpoint. An application of one of user devices 16 may enable a user to view one or more aspects of HVAC controller 20.

In some examples, it may be beneficial for HVAC controller 20 to track a rotational position of dial 22 over time so that HVAC controller 20 may determine an amount to change one or more parameters based on the rotation of dial 22 or so that HVAC controller 20 may change one or more other values, effects, or displays based on the rotation of dial 22. In some examples, dial 22 represents a first rotatable part. HVAC controller 20 may include a second rotatable part (not illustrated in FIG. 1) configured to interact with the first rotatable part. In some examples, an inner surface of the dial 22 includes a first gear, the second rotatable part represents a second gear, and one or more teeth of the first gear engage with one or more teeth of the second gear such that the second gear rotates when the first gear rotates, and the first gear rotates when the second gear rotates. The first rotatable part and the second rotatable part do not necessarily need to include gears. The first rotatable part may represent any kind of rotatable part configured to interact with the second rotatable part such that the second rotatable part rotates when the first rotatable part rotates, and the first rotatable part rotates when the second rotatable part rotates.

In some examples, a diameter of the second rotatable part may be less than a diameter of the first rotatable part, and the second rotatable part may be located within a circumference of the first rotatable part. Consequently, an inner edge of the first rotatable part may interact with an outer edge of the second rotatable part. When the diameter of the second rotatable part is less than the diameter of the first rotatable part, one rotation of the first rotational part may correspond to more than one rotation of the second rotatable part.

In some examples, a magnet (not illustrated in FIG. 1) may be located on the second rotatable part. The magnet may be fixed to the second rotatable part such that the magnet rotates with the second rotatable part. In some examples, a center of the magnet may be disposed on a center of the second rotatable part such that the second rotatable part and the magnet rotate about the same axis of rotation. A sensor (not illustrated in FIG. 1), in some cases, may be located within a housing of HVAC controller 20 and displaced from the second rotatable part relative to a center of HVAC controller 20. The magnet located on the second rotatable part may include a first pole and a second pole. The sensor may determine a first electrical signal component based on the first pole and a second electrical signal component based on the second pole. Based on the first electrical signal component and the second electrical signal component, processing circuitry of HVAC controller 20 may be configured to determine a rotational position of the magnet. Since the magnet and the second rotatable part rotate with the first rotatable part of dial 22, the processing circuitry of HVAC controller 20 may be configured to control one or more parameters based on the rotation of the magnet, where the rotation of the magnet reflects the rotation of dial 22.

In some examples, if a Buoy water valve is installed, HVAC controller 20 may receive details on water usage and leak status. In some examples, if a security system is installed, HVAC controller 20 may control the security system.

Figure 2:
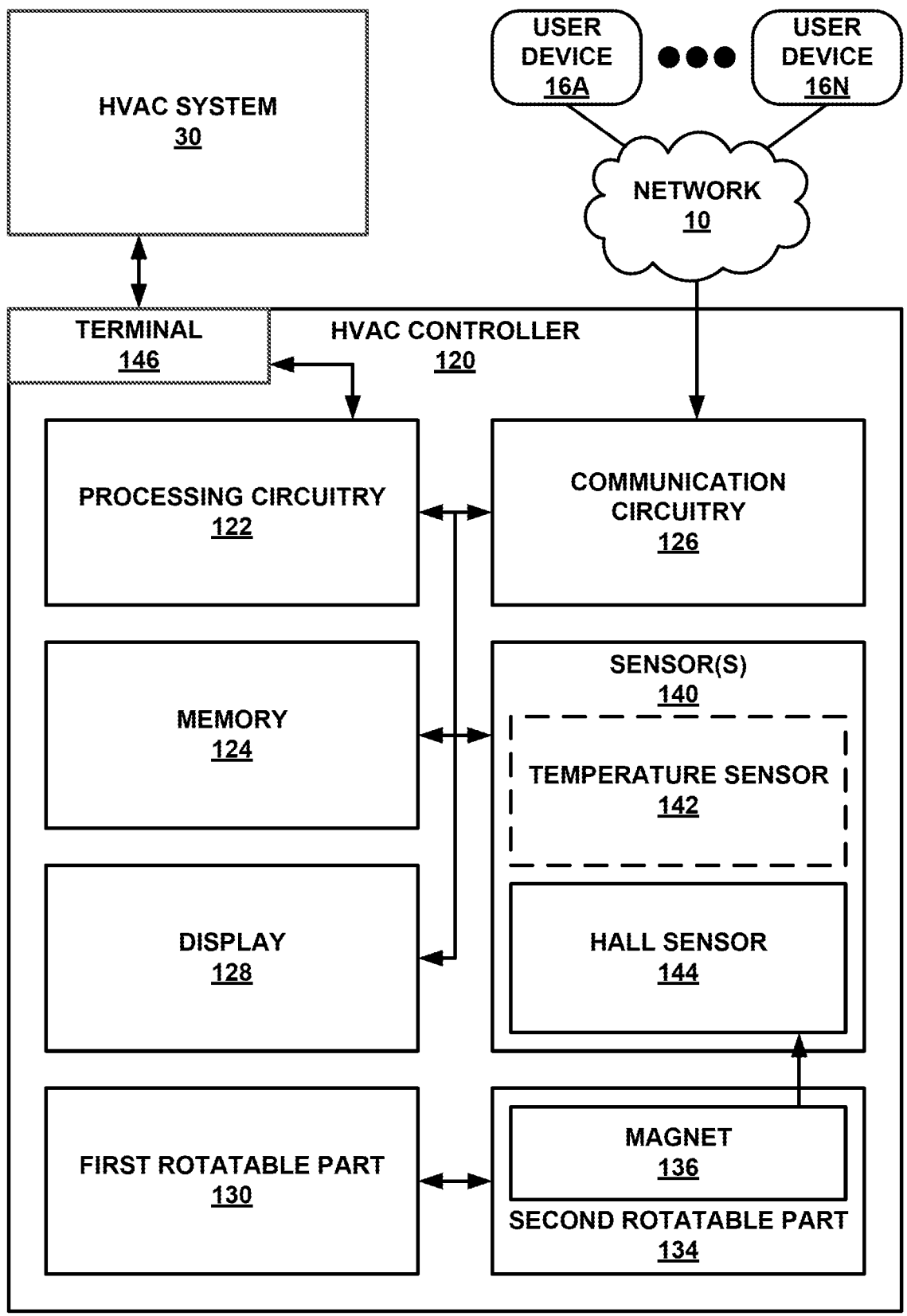
FIG. 2 is a block diagram illustrating an example HVAC controller which is configured to determine a rotational position of a magnet, in accordance with one or more techniques described herein.

FIG. 2 is a block diagram illustrating an example HVAC controller 120 which is configured to determine a rotational position of magnet 136, in accordance with one or more techniques described herein. As seen in FIG. 2, HVAC controller 120 includes processing circuitry 122, memory 124, communication circuitry 126, display 128, first rotatable part 130, second rotatable part 134, magnet 136, and sensor(s) 140. Sensor(s) 140 may, in some examples, include a temperature sensor 142 and a Hall effect sensor 144. HVAC controller 120 may be configured to communicate with HVAC system 30 via terminal 146 and/or communicate with user devices 16A-16N (collectively, "user devices 16") via network 14. In some examples, HVAC controller 120 is an example of HVAC controller 20 of FIG. 1. In some examples, first rotatable part 130 is an example of dial 22 of FIG. 1. In some examples, display 128 is an example of display 24 of FIG. 1.

HVAC controller 120 may be configured to control HVAC system 30 in order to regulate one or more parameters of a space (e.g., a building, one or more rooms within a building, a large vehicle, or a vessel). In some examples, HVAC controller 120 regulates a temperature within the space. HVAC controller 120 may regulate the temperature of the space by using HVAC system 30 to decrease a temperature of the space if the current temperature of the space is greater than a first set point temperature and/or increase a temperature of the space using HVAC system 30 if the current temperature of the space is less than a second set point temperature. In some examples, the first set point temperature (e.g., a cooling set point temperature) is less than the second set point temperature (e.g., a heating set point temperature). In some examples, the first set point temperature is equal to the second set point temperature.

Processing circuitry 122 may include fixed function circuitry and/or programmable processing circuitry. Processing circuitry 122 may include any one or more of a microprocessor, a controller, a DSP, an ASIC, an FPGA, or equivalent discrete or analog logic circuitry. In some examples, processing circuitry 122 may include multiple components, such as any combination of one or more microprocessors, one or more controllers, one or more DSPs, one or more ASICs, or one or more FPGAs, as well as other discrete or integrated logic circuitry. The functions attributed to processing circuitry 122 herein may be embodied as software, firmware, hardware or any combination thereof.

In some examples, memory 124 includes computer-readable instructions that, when executed by processing circuitry 122, cause HVAC controller 120 and processing circuitry 122 to perform various functions attributed to HVAC controller 120 and processing circuitry 122 herein. Memory 124 may include any volatile, non-volatile, magnetic, optical, or electrical media, such as RAM, ROM, NVRAM, EEPROM, flash memory, or any other digital media.

Communication circuitry 126 may include any suitable hardware, firmware, software or any combination thereof for communicating with another device, such as user devices 16 or other devices. Under the control of processing circuitry 122, communication circuitry 126 may receive downlink telemetry from, as well as send uplink telemetry to, one of user devices 16 or another device with the aid of an internal or external antenna. Communication circuitry 126 may include a Bluetooth transmitter and receiver, a Wi-Fi transmitter and receiver, a Zigbee transceiver, a near-field communication transceiver, or other circuitry configured to allow HVAC controller 120 to communicate with one or more remote devices such as user devices 16. In some examples, communication circuitry 126 may allow HVAC controller 120 to exchange data with external computing device 50 of FIG. 1. Examples of exchanged data include a desired temperature for the space, one or more control parameters for HVAC system 30, error codes, geographic location, estimated energy usage and cost, and/or other operating parameters or system performance characteristics for HVAC system 30.

Display 128 may represent any one or both of digital elements and analog elements. Display 128 may be located on a face of HVAC controller 120. In some examples, display 128 may include a set of markers, an electric motor, and a pointer connected to the electric motor. Each mark of the set of markers may represent a respective parameter value of a parameter corresponding to HVAC controller 120. For example, the parameter may include temperature and each mark of the set of markers may represent a respective temperature value. For example, the temperature values corresponding to the set of markers may be within a range from 40° F. to 90° F., but this is not required. The temperature values may represent another range of temperatures. In some examples, the set of markers may be spaced evenly across a portion of the circumference of display 128. For example, each marker of the set of markers may be separated from each neighboring marker of the set of markers by a predetermined distance.

The pointer may extend along a radius of display 128 and the pointer may be configured to rotate about a center point of display 128 such that pointer "points" at one or more markers of the set of markers. In some examples, the electric motor may receive an electric signal from processing circuitry 122 which causes the electric motor to place the pointer in order to indicate a current temperature of the space in which HVAC controller 120 is performing temperature regulation using HVAC system 30. In some examples, processing circuitry 122 receives a temperature signal from temperature sensor 142, the temperature signal indicating the current temperature of the space in real-time or near real-time. Processing circuitry 122 may cause the electric motor to place (e.g., rotate) the pointer based on the temperature signal in order to indicate the current temperature by pointing the pointer at a mark of the set of markers which corresponds to the current temperature.

In some examples, display 128 includes a set of LEDs. In some examples, processing circuitry 122 is configured to selectively activate the set of LEDs in order to selectively illuminate one or more of the set of markers on display 128. In some examples, processing circuitry 122 selectively illuminates one or more of the set of markers in order to indicate one or more temperature set points (e.g., the cooling set point and/or the heating set point). The set of LEDs may be located behind a surface of display 128 which includes the set of markers. In some examples, the set of LEDs may emit optical signals which cause one or more markers of the set of markers to light up.

First rotatable part 130 is a rotatable element of HVAC controller 120 which is configured to cause processing circuitry 122 to update one or more parameters or change one or more screens for display 128. In some examples, a housing of HVAC controller 120 may be substantially cylindrical in shape and first rotatable part 130 may represent a ring-shaped piece that is located at an outer circumference of HVAC controller 120. In some examples, HVAC controller 120 includes a first face configured to be mounted on a plate which is fixed to a wall or another surface, a second face including display 128, and a third face representing a side of HVAC controller 120, the third face extending around a circumference of HVAC controller 120. First rotatable part 130 may include the third face of HVAC controller 120. In some examples, first rotatable part 130 is configured to rotate with respect to one or more other components of HVAC controller 120. For example, first rotatable part 130 is configured to rotate with respect to display 128. In some examples, first rotatable part 130 is configured to rotate in response to a user input.

In some examples, first rotatable part 130 includes a first gear. In some examples, the first gear is located on an inside surface of the first rotatable part 130. The outside surface of first rotatable part 130 may represent a surface of HVAC controller 120 which is configurable to be gripped or grabbed by a user, allowing the user to rotate the first rotatable part 130. The inside surface of first rotatable part 130, may be "within" a housing of HVAC controller 20 such that the inside surface is hidden from view. The first gear may include a first number of teeth. The first gear may be fixed to the inside surface of first rotatable part 130 such that the first gear rotates with the first rotatable part 130. In other words, a rotation of the first rotatable part 130 by a rotational displacement may cause the gear to rotate in line with first rotatable part 130.

In some examples, first rotatable part 130 engages with second rotatable part 134. First rotatable part 130 may include a first gear which engages with a second gear of the second rotatable part 134. Second rotatable part 134 may be located within a housing of HVAC controller 120. As such, the second rotatable part 134 is located within a circumference of the first rotatable part 130. In some examples, for the first gear of first rotatable part 130 to engage with the second gear of second rotatable part 134, the teeth of the first gear may partially interleave with the teeth of the second gear. As the first gear rotates, the second gear also rotates, since the teeth of the first gear are partially interleaved with the teeth of second gear. Magnet 136 may be located on or within the second rotatable part such that magnet 136 rotates with second rotatable part 134. In some examples, a center of magnet 136 is disposed on a center of second rotatable part 134. Consequently, a rotation of the first rotatable part 130 may cause second rotatable part 134 to rotate, which in turn causes magnet 136 to rotate. In some examples, a ratio of a second number of teeth of the second gear to a first number of teeth of the first gear may represent the gear ratio of the second gear to the first gear.

In some examples, HVAC controller 120 includes one or more sensor(s) 140 including temperature sensor 142 and Hall effect sensor 144. In some examples, temperature sensor 142 is located within a housing of HVAC controller 120. In some examples, temperature sensor 142 is located remotely from HVAC controller 120 and may communicate with HVAC controller 120 via communication circuitry 126.

For example, temperature sensor 142 may be located in the same room or the same area as HVAC controller 120 while being separate from HVAC controller 120 such that heat generated from components of HVAC controller 120 does not affect a temperature signal generated by temperature sensor 142. It may be beneficial for temperature sensor 142 to be located separately from HVAC controller 120 in order to obtain an accurate temperature reading. In some examples where temperature sensor 142 is located within the housing of HVAC controller 120, HVAC controller 120 may prevent components from affecting a temperature signal generated by temperature sensor 142. In some examples, at least a portion of the housing of HVAC controller 120 may include stainless steel and the housing may be coated with a material which hides fingerprints. In some examples, the term "housing" may be used herein to describe an outer surface of HVAC controller 120, including on outer surface of the first rotatable part 130, an outer surface of display 128, and an outer face of HVAC controller 120 which is fixed to a wall or another surface.

Hall effect sensor 144 may, in some examples, be configured to sense magnetic field. For example, magnet 136 may include a first pole and a second pole. Hall effect sensor 144 may be configured to generate a first electrical signal indicative of a strength of a magnetic field of the first pole at a position of Hall effect sensor 144. Additionally, or alternatively, Hall effect sensor 144 may be configured to generate a second electrical signal indicative of a strength of a magnetic field of the second pole at the position of Hall effect sensor 144. Magnetic field decays moving away from a source of the magnetic field. As such, the first electrical signal may represent a first value when the first pole is located a first distance away from Hall effect sensor 144 and the first electrical signal may represent a second value when the first pole is located a second distance away from Hall effect sensor 144. When the first distance is greater than the second distance, the second value is greater than the first value, since a closer distance between magnet and sensor corresponds to a stronger sensed magnetic field.

In some examples, the first pole and the second pole are located opposite each other on opposite sides of a center of magnet 136. In this way, as magnet 136 rotates with the second rotatable part 134, the first pole rotates about the center of magnet 136 and the second pole rotates about the center of magnet 136. Hall effect sensor 144 is fixed relative to a center of magnet 136. As such, processing circuitry 122 may determine a rotational position of magnet 136 based on the first electrical signal generated by Hall effect sensor 144 and the second electrical signal generated by Hall effect sensor 144. By tracking the rotational position of magnet 136 over time, processing circuitry 122 may also determine the rotational velocity and the rotational acceleration of magnet 136. For example, velocity over time is the derivative of position over time and acceleration over time is the derivative of velocity over time. Processing circuitry 122 may be configured to generate a signal which indicates the derivative of the angular position of magnet 136 over time in order to determine the angular velocity of magnet 136 over time. Additionally, processing circuitry 122 may be configured to generate a signal indicative of the derivative of the angular velocity of magnet 136 over time in order to determine the angular acceleration of magnet 136 over time.

Magnet 136 is fixed to second rotatable part 134 so that magnet 136 rotates with second rotatable part 134. In other words, when the second rotatable part 134 rotates by a first amount of rotational displacement, magnet 136 rotates by the same first amount of rotational displacement at a same rotational velocity and rotational acceleration as second rotatable part 134 throughout a duration of the rotation by the first amount of rotational displacement. One or more teeth of the second gear of the second rotatable part 134 may engage with one or more teeth of the first gear of the first rotatable part 130 such that the second gear of the second rotatable part 134 rotates when the first gear rotates. In some examples, first rotatable part 130 and second rotatable part 134 may rotate in opposite directions. That is, when first rotatable part 130 rotates in a clockwise direction, second rotatable part 134 rotates in a counterclockwise direction, and when first rotatable part 130 rotates in a counterclockwise direction, second rotatable part 134 rotates in a clockwise direction. The first gear may be fixed to the first rotatable part 130 so that the first rotatable part 130 and the first gear rotate together. As such, a rotation of the first rotatable part 130 causes a rotation of the second gear of the second rotatable part 134, and a rotation of the first rotatable part 130 causes a rotation of magnet 136. For example, when the first rotatable part 130 and the first gear rotate together, this causes second rotatable part 134 and magnet 136 to rotate in an opposite direction.

It may be possible to determine the rotational position of the first rotatable part 130 based on the gear ratio of the second number of teeth of the second gear to the first number of teeth of the first gear, but this is not required. In some examples, processing circuitry 122 may perform one or more techniques described herein based on determining one or more parameters of a rotation (e.g., rotational position, rotational velocity, and rotational acceleration) without determining one or more rotational parameters of the first rotatable part 130.

Processing circuitry 122 may be configured to set and/or change one or more temperature set points corresponding to the space in which HVAC controller 120 regulates temperature. For example, a first set point temperature may represent a cooling set point temperature and a second set point temperature may represent a heating set point temperature. In some examples, if HVAC controller 120 is in a cooling mode and the current temperature is greater than the cooling set point temperature, processing circuitry 122 may control HVAC system 30 to regulate the temperature in the space to approach the cooling set point temperature over a period of time based on the current temperature and the cooling set point temperature. In some examples, if HVAC controller 120 is in a heating mode and the current temperature is less than the heating set point temperature, processing circuitry 122 may control HVAC system 30 to regulate the temperature in the space to approach the heating set point temperature over a period of time based on the current temperature and the heating set point temperature.

In some example, processing circuitry 122 is configured to receive an instruction to change and/or set one or more temperature set points of HVAC controller 120 from dial circuitry electrically connected to the first rotatable part 130, where the instruction is indicative of a user selection of one or more temperature set points using the first rotatable part 130. For example, in response to a first rotation of first rotatable part 130, processing circuitry 122 may set the cooling temperature set point value to a first temperature value if a cooling set point mode of HVAC controller 120 is activated. In some examples, HVAC controller 120 includes a mode button (not illustrated in FIG. 2) electrically connected to processing circuitry 122 which is configured to generate a signal based on a user request to switch a set point mode between the cooling set point mode and a heating set point mode. In response to a second rotation of first rotatable part 130, processing circuitry 122 may set the heating temperature set point value to a second temperature value if a heating set point mode of HVAC controller 120 is activated. In some examples, processing circuitry 122 is configured to receive an instruction to change and/or set one or more temperature set points of HVAC controller 120 from one or more of user devices 16 via network 14. Processing circuitry 122 may change the one or more temperature set points based on such an instruction.

Hall effect sensor 144 may represent an angle sensor configured to generate one or more signals which allow processing circuitry 122 to measure an absolute rotational position of magnet 136. Hall effect sensor 144 may measure an angular position of one or more poles of magnet 136 relative to a sensor axis which passes through a center of Hall effect sensor 144 and a center of magnet 136. For example, magnet 136 may include a first pole and a second pole. Hall effect sensor 144 may generate a first electrical signal which indicates a location of the first pole relative to Hall effect sensor 144 and a second electrical signal which indicates a location of the second pole relative to Hall effect sensor 144. Processing circuitry 122 is configured to determine the rotational position of magnet 136 based on the first electrical signal and the second electrical signal. Since magnet 136 is fixed to second rotatable part 134, the rotational position of magnet 136 is the same as a rotational position of second rotatable part 134. Using a ratio (e.g., a gear ratio) of the number of teeth on the second gear of the second rotatable part 134 to the number of teeth on the first gear of the first rotatable part 130, processing circuitry 122 may be configured to determine the angular position of first rotatable part 130, but this is not required. For example, the teeth of second gear are interleaved with the teeth of the first gear, meaning that when first rotatable part 130 rotates, second rotatable part 134 also rotates. Processing circuitry 122 is configured to determine the rotational position of first rotatable part 130 based on the determined rotational position of magnet 136 and the ratio of the number of teeth on the second gear to the number of teeth on the first gear.

Hall effect sensor 144 may, in some examples, include a first Hall effect sensor component and a second Hall effect sensor component. The first Hall effect sensor component and the second Hall effect sensor component may include a phase offset which allows the first Hall effect sensor component to sense a magnetic field of a first pole of magnet 136 and allows the second Hall effect sensor component to sense a magnetic field of a second pole of magnet 136. In some examples, the phase offset between the first Hall effect sensor component and the second Hall effect sensor component is 90 degrees.

Magnet may be displaced relative to Hall effect sensor 144. This may cause the magnetic field measured by Hall effect sensor 144 to not be perfectly proportional to the rotational position of magnet 136. Processing circuitry 122 may account for imperfections in the relationship between the magnetic field measured by Hall effect sensor 144 and the rotational position of magnet 136 such that processing circuitry 122 may determine a correct and accurate rotational position of magnet 136 based on the magnetic field measured by Hall effect sensor 144. In some examples, processing circuitry 122 may include one or both of an integrated microcontroller on Hall effect sensor 144 and an application microcontroller within HVAC controller 120.

The HVAC controller 120 may determine a rotational position of first rotatable part 130 more precisely than other HVAC controllers which sense magnetic field to determine rotational position. For example, magnet 136 may include a single pair of poles. The Hall effect sensor 144 may generate electrical signals which indicate the position of each pole of the single pair of poles relative to the Hall effect sensor 144 in order to track a rotation of first rotatable part 130. In some examples, processing circuitry 122 determines the rotational position of magnet 136 more effectively when magnet 136 includes a single pair of poles and Hall effect sensor 144 is displaced from magnet 136 as compared with example HVAC controllers which sense rotation based on determining an incremental rotation of a magnet having more than one pair of poles. For example, a system which "incrementally" senses a rotation of a magnet having a plurality of pole pairs may sense a number of poles which pass a Hall effect sensor over a period of time. The system may know the number of pole pairs in the magnet and based on this number, the system may determine an amount in which the magnet rotates. In order to more accurately determine the rotation of a magnet using incremental sensing, the magnet may include a large number (e.g., at least 40) of pole pairs.

HVAC controller 120 includes a magnet 136 comprising a single pole pair and a Hall effect sensor 144 which measures an absolute rotational position of each pole of the single pole pair. This allows processing circuitry 122 to precisely determine the absolute rotational position of magnet 136 without relying on the less reliable incremental sensing of rotation. For example, an advantage of sensing the absolute rotational position of magnet 136 rather than sensing the incremental position of magnet 136 is that magnet 136 may be very small in size when magnet 136 includes a single set of poles, whereas a magnet including more than one pole pair may be larger than magnet 136. As such, magnet 136 may include only one pair of poles so that magnet 136 can more easily fit inside the housing of HVAC controller 120 as compared with a magnet which includes more than one pole pair.

In some examples, first rotatable part 130 is grounded in order to reduce the electrical field created during electrostatic discharges. First rotatable part 130 may include a stainless steel material. First rotatable part 130 and second rotatable part 134 may also include a stainless steel material. HVAC controller 120 may include a board having a bushing made of copper with a wear-resistant plate. This bushing may be soldered ground. As such, HVAC controller 120 may include an electrical connection to ground while decreasing mechanical noise.

Figure 3A:
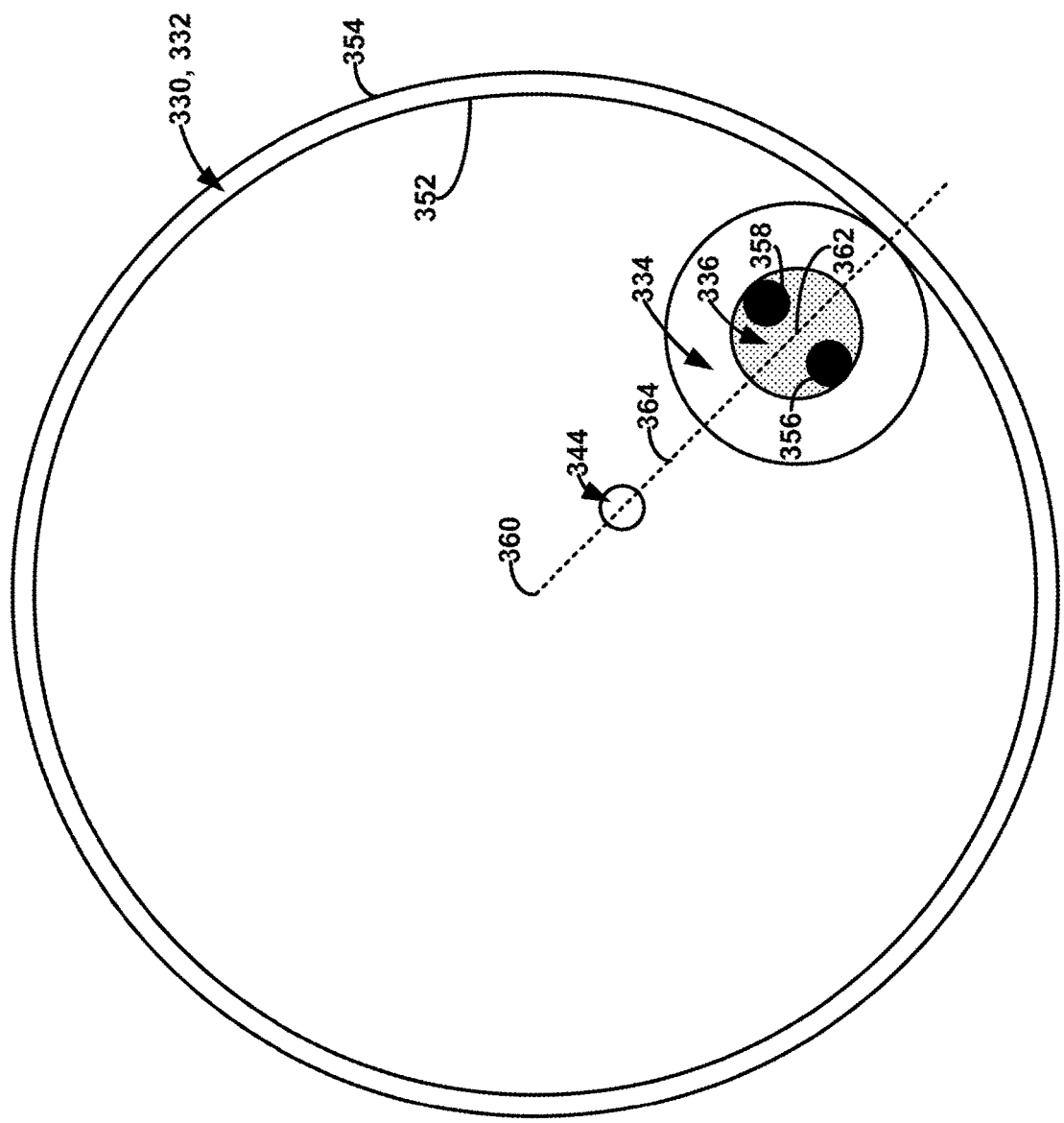
FIG. 3A is a conceptual diagram illustrating a cross-sectional view of HVAC controller, in accordance with one or more techniques described herein.

FIG. 3A is a conceptual diagram illustrating a cross-sectional view of HVAC controller 320A, in accordance with one or more techniques described herein. HVAC controller 320A includes dial 330, first gear 332, second gear 334, magnet 336, and Hall effect sensor 344. Dial 330 includes inner edge 352 and outer edge 354. Magnet 336 includes first pole 356 and second pole 358. Controller 320A may be an example of HVAC controller 120 of FIGS. 1-2. Dial 330 and first gear 332 may be an example of first rotatable part 130 of FIG. 2. Second gear 334 may be an example of second rotatable part 134 of FIG. 2. Magnet 336 may be an example of magnet 136 of FIG. 2. Hall effect sensor 344 may be an example of Hall effect sensor 144 of FIG. 2.

In some examples, dial 330 may be configured to rotate about a center 360 of HVAC controller 320A. Dial 330 includes inner edge 352 and outer edge 354. The first gear 332, which includes a first set of teeth (not illustrated in FIG. 3A), is located on the inner edge 352 of dial 330. The second gear 334, which includes a second set of teeth (not illustrated in FIG. 3A), is located on an inside of dial 330 while being in contact with dial 330. For example, the first set of teeth of first gear 332 may be partially interleaved with the second set of teeth of second gear 342 so that when first gear 332 rotates, second gear 334 rotates in a rotational direction opposite of the rotational direction in which first gear 332 rotates. In some examples, the number of teeth in the first set of teeth is greater than the number of teeth in the second set of teeth, meaning that when first gear 332 completes one full rotation, second gear 334 rotates more than one full rotation.

Magnet 336 may be disposed on second gear 334. For example, point 362 may represent both of the center of second gear 334 and the center of magnet 336. Magnet 336 is fixed to second gear 334 so that when second gear 334 rotates, magnet 336 rotates together with second gear 334. First pole 356 and second pole 358 are displaced from point 362, which is the center of magnet 336. As such, when magnet 336 rotates, first pole 356 travels around point 362 in a circular pattern and second pole 358 travels around point 362 in a circular pattern. Hall effect sensor 344 is located on the inside of dial 330 and Hall effect sensor 344 is displaced from point 362 which represents the center of magnet 336. In some examples, it may be beneficial for Hall effect sensor 344 to be displaced from the center of magnet 336 so that Hall effect sensor 344 can fit easily within the housing of controller 320A. A sensor axis 364 may pass through a center 360 of HVAC controller 320A, a center of Hall effect sensor 344, and the center point 362 of magnet 336.

As seen in FIG. 3A, first pole 356 is illustrated as being displaced from sensor axis 364 and second pole 358 is illustrated as being displaced from sensor axis 364. If second gear 334 rotates 90 degrees from the position illustrated in FIG. 3A, for example, first pole 356 would be located on sensor axis 364 and second pole 358 would be located on sensor axis 364. In other words, a position of second gear 334 is fixed relative to the center 360 of HVAC controller 320A and a position of magnet 336 is fixed relative to the center 360 of HVAC controller 320A. Second gear 334 and magnet 336 may rotate in place as dial 330 rotates, causing first pole 356 and second pole 358 to move in circular patterns about point 362 while Hall effect sensor 344 remains fixed in place. As such, the location of first pole 356 in relation to Hall effect sensor 344 changes as magnet 336 rotates and the location of second pole 358 in relation to Hall effect sensor 344 changes as magnet 336 rotates.

In some examples, Hall effect sensor 344 generates a first electrical signal corresponding to first pole 356 and hall effect sensor 344 generates a second electrical signal corresponding to second pole 358. For example, hall effect sensor 344 may include a first Hall effect sensor component which generates the first electrical signal and a second Hall effect sensor component which generates the second electrical signal. The first electrical signal may indicate a strength of a first magnetic field generated by the first pole 356 from the position of Hall effect sensor 344 and the second electrical signal may indicate a strength of a second magnetic field generated by the second pole 358 from the position of Hall effect sensor 344. The strength of a magnetic field decays moving away from a source of the respective magnetic field. As such, a relationship may exist between the strength of the first magnetic field generated by first pole 356 as indicated by the first electrical signal and the distance between the first pole 356 and the Hall effect sensor 344. Additionally, or alternatively, a relationship may exist between the strength of the second magnetic field generated by second pole 358 as indicated by the second electrical signal and the distance between the second pole 358 and the Hall effect sensor 344.

In some examples, processing circuitry 122 of the HVAC controller 120 of FIG. 1 may be configured to identify a value (e.g., a magnitude) of the first electrical signal component. Additionally, processing circuitry 122 may identify a value (e.g., a magnitude) of the second electrical signal component. Processing circuitry 122 may determine a difference between the value of the first electrical signal component and the value of the second electrical signal component. Processing circuitry 122 may determine a rotational position of second gear 334 based on the value of the first electrical signal component, the value of the second electrical signal component, and the difference between the value of the first electrical signal component and the value of the second electrical signal component. Additionally, or alternatively, processing circuitry 122 may determine a rotational position of second gear 334 based on one or both of the value of the first electrical signal component and the value of the second electrical signal component without determining the difference between the value of the first electrical signal component and the value of the second electrical signal component.

Since the first electrical signal component generated by the Hall effect sensor 344 and the second electrical signal component generated by the Hall effect sensor 344 indicate a position of first pole 356 relative to hall effect sensor 344 and a position of second pole 358 relative to hall effect sensor 344, the first electrical signal component and the second electrical signal component may also indicate a position of first pole 356 relative to sensor axis 364 and a position of second pole 358 relative to sensor axis 364. In one example, magnet 336 may rotate 45 decrees clockwise from the position of magnet 336 illustrated in FIG. 3A. In this example, first pole 356 may rotate 45 degrees clockwise, thus moving closer to Hall effect sensor 344. Additionally, second pole 358 may rotate 45 degrees clockwise, thus moving further away from Hall effect sensor 344. The first electrical signal component may increase in strength due to this 45 degree clockwise rotation and the second electrical signal component may decrease in strength due to the rotation. Processing circuitry 122 may determine, based on the first electrical signal component and based on the second electrical signal component, that magnet 336 has rotated 45 degrees clockwise based on the increase in strength of the first magnetic field as indicated by the first electrical signal component and the decrease in strength of the second electrical signal component as indicated by the second electrical signal.

Figure 3B:
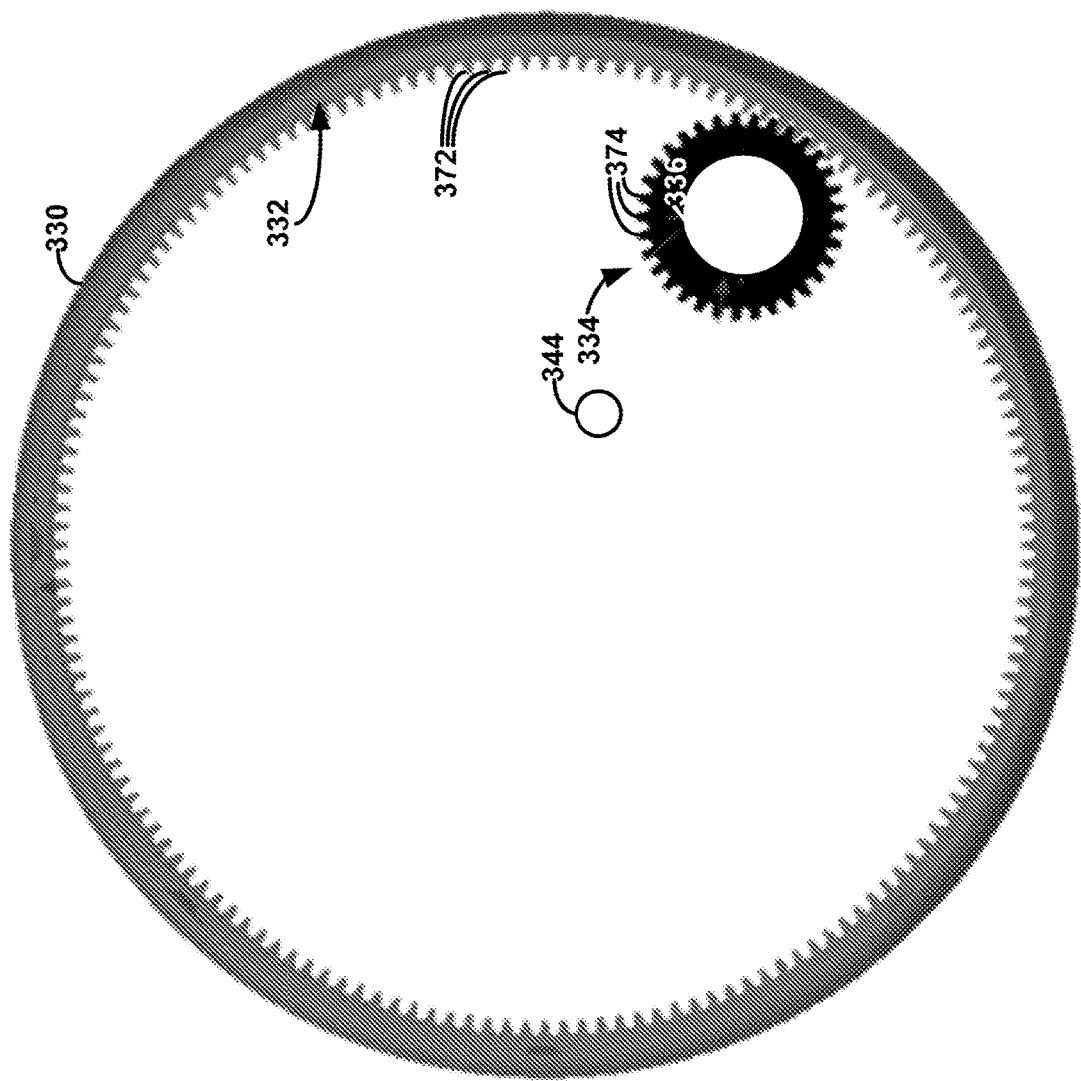
FIG. 3B is a conceptual diagram illustrating a cross-sectional view of HVAC controller including a first gear and a second gear, in accordance with one or more techniques described herein.

FIG. 3B is a conceptual diagram illustrating a cross-sectional view of HVAC controller 320B including a first gear 332 and a second gear 334, in accordance with one or more techniques described herein. HVAC controller 320B includes dial 330, first gear 332, second gear 334, magnet 336, and Hall effect sensor 344. HVAC controller 320B may be an example of HVAC controller 120 of FIGS. 1-2. Dial 330 and first gear 332 may be an example of first rotatable part 130 of FIG. 2. Second gear 334 may be an example of second rotatable part 134 of FIG. 2. Magnet 336 may be an example of magnet 136 of FIG. 2. Hall effect sensor 344 may be an example of Hall effect sensor 144 of FIG. 2. HVAC controller 320B may be substantially the same as HVAC controller 320A, except that the HVAC controller 320B of FIG. 3A includes the first set of teeth 372 of first gear 332 and the second set of teeth 374 of second gear 334, which are not illustrated in FIG. 3A. As seen in FIG. 3B, the first set of teeth 372 may be partially interleaved with the second set of teeth 374.

Figure 3C:
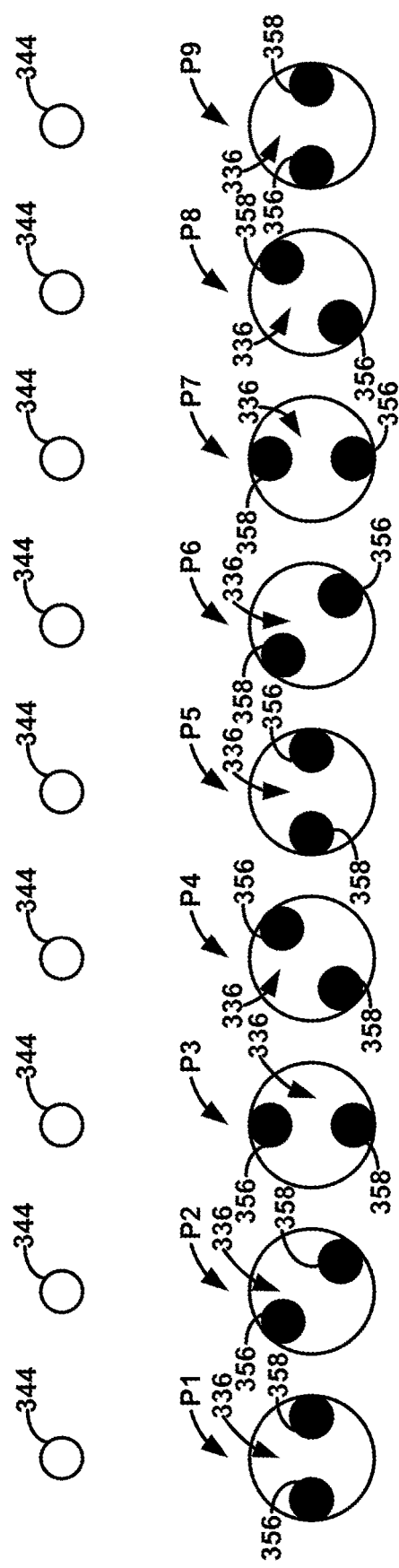
FIG. 3C is a conceptual diagram illustrating an example set of rotational positions of a magnet, a first electrical signal component corresponding to a first pole of the magnet, and a second electrical signal component corresponding to second pole of the magnet, in accordance with one or more techniques described herein.
Figure 3C:
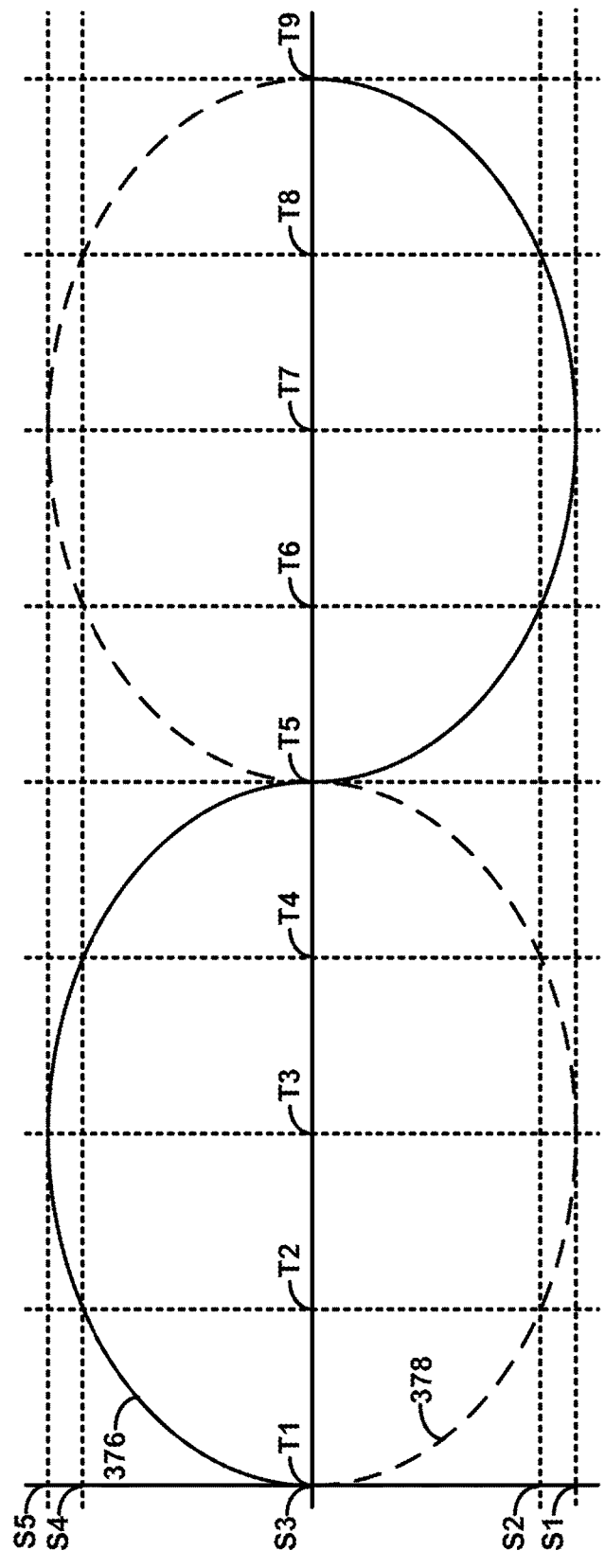

FIG. 3C is a conceptual diagram illustrating an example set of rotational positions of magnet 336, a first electrical signal component 376 ("signal 376") corresponding to first pole 356, and a second electrical signal component 378 ("signal 378") corresponding to second pole 358, in accordance with one or more techniques described herein. Although FIG. 3C illustrates nine rotational positions (P1-P9) of magnet 336, this is not meant to be limiting. Magnet 336 may occupy one or more rotational positions which are not illustrated by FIG. 3C.

Signal 376 and signal 378, which are generated by Hall effect sensor 344, may change based on a rotational position of magnet 366. For example, when magnet 336 is occupying rotational position P1 at time T1, signal 376 may indicate the value S3 and signal 378 may indicate the value S3. Additionally, when magnet 336 is occupying position P2 at time T2, signal 376 may indicate the value S4 and signal 378 may indicate the value S2, when magnet 336 is occupying position P3 at time T3, signal 376 may indicate the value S5 and signal 378 may indicate the value S1, and so on. As such, the respective values of signal 376 and signal 378 may indicate the rotational position of magnet 336. Processing circuitry 122 of FIG. 2, for example, may receive signal 376 and signal 378 from Hall effect sensor 344 and determine, based on signal 376 and signal 378, the rotational position of magnet 336.

Rotational positions P1-P9 represent one full rotation of magnet 336. For example, as seen in FIG. 3C, first pole 356 rotates 360° around a center of magnet 336 from rotational position P1 to rotational position P9 and second pole 358 rotates 360° around a center of magnet 336 from rotational position P1 to rotational position P9. Consequently, rotational position P1 is the same as rotational position P9. Because a position of Hall effect sensor 344 is fixed relative to a position of magnet 336 and magnet 336 is configured to rotate in place, the position of first pole 336 changes relative to Hall effect sensor 344 and the position of second pole 338 changes relative to Hall effect sensor 344. Signal 376 and signal 378 change as a function of the distance between first pole 356 and Hall effect sensor 344 and a function of the distance between second pole 358 and Hall effect sensor 344, respectively. As such, processing circuitry 122 of FIG. 2 may, for example, determine a rotational position of magnet 336 based on one or both of signal 376 signal 378.

Figure 4:
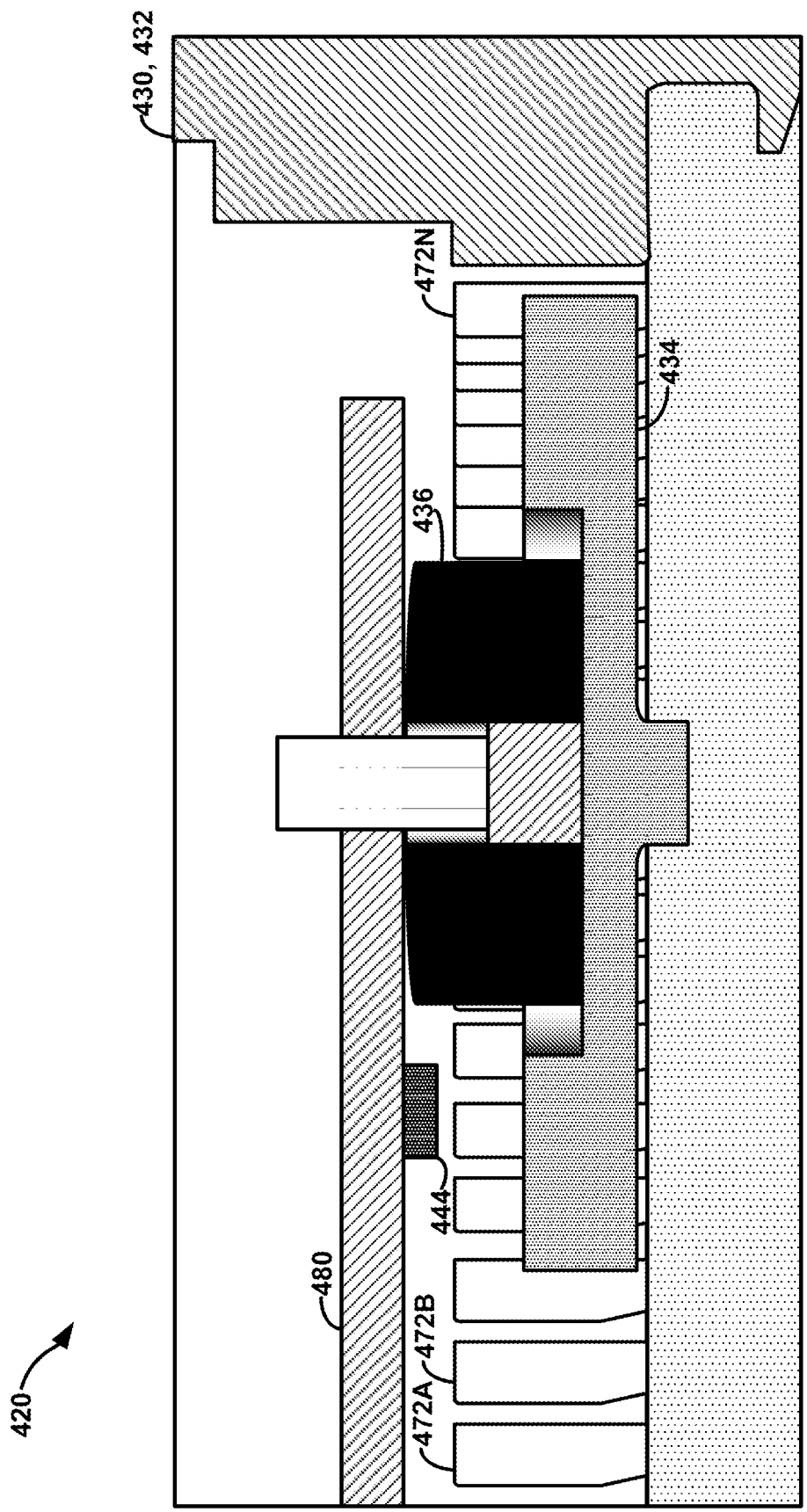
FIG. 4 is a conceptual diagram illustrating a cut-away side view of an HVAC controller, in accordance with one or more techniques described herein.

FIG. 4 is a conceptual diagram illustrating a cut-away side view of an HVAC controller 420, in accordance with one or more techniques described herein. HVAC controller 420 includes dial 430, first gear 432, second gear 434, magnet 436, Hall effect sensor 444, and printed circuit board (PCB) 480. First gear 432 includes teeth 472A-472N (collectively, "teeth 472"). HVAC controller 420 may be an example of HVAC controller 120 of FIGS. 1-2. Dial 430 and first gear 432 may be an example of first rotatable part 130 of FIG. 2. Second gear 434 may be an example of second rotatable part 134 of FIG. 2. Magnet 436 may be an example of magnet 136 of FIG. 2. Hall effect sensor 444 may be an example of Hall effect sensor 144 of FIG. 2.

As seen in FIG. 4, dial 430 may include a first gear 432 which includes a set of teeth 472 on an inside edge of dial 430. Second gear 434 may include a set of teeth (not illustrated in FIG. 4) which engage with teeth 472 such that a rotation of dial 430 causes second gear 434 to rotate. Magnet 436 is fixed at a center of second gear 434 such that magnet 436 rotates with second gear 434. Hall effect sensor 444 is displaced from magnet 436, where Hall effect sensor 444 is located closer to a center of HVAC controller 420 than magnet 436. Hall effect sensor 444 may be displaced from magnet 436 so that both of magnet 436 and Hall effect sensor 444 fit within a housing of HVAC controller 420. In some examples, magnet 436 includes a single pair of poles so that magnet 436 fits within the housing of HVAC controller 420. Hall effect sensor 444 is fixed to PCB 480 such that hall effect sensor 444 is electrically connected to processing circuitry (e.g., processing circuitry 122 of FIG. 2).

Figure 5:
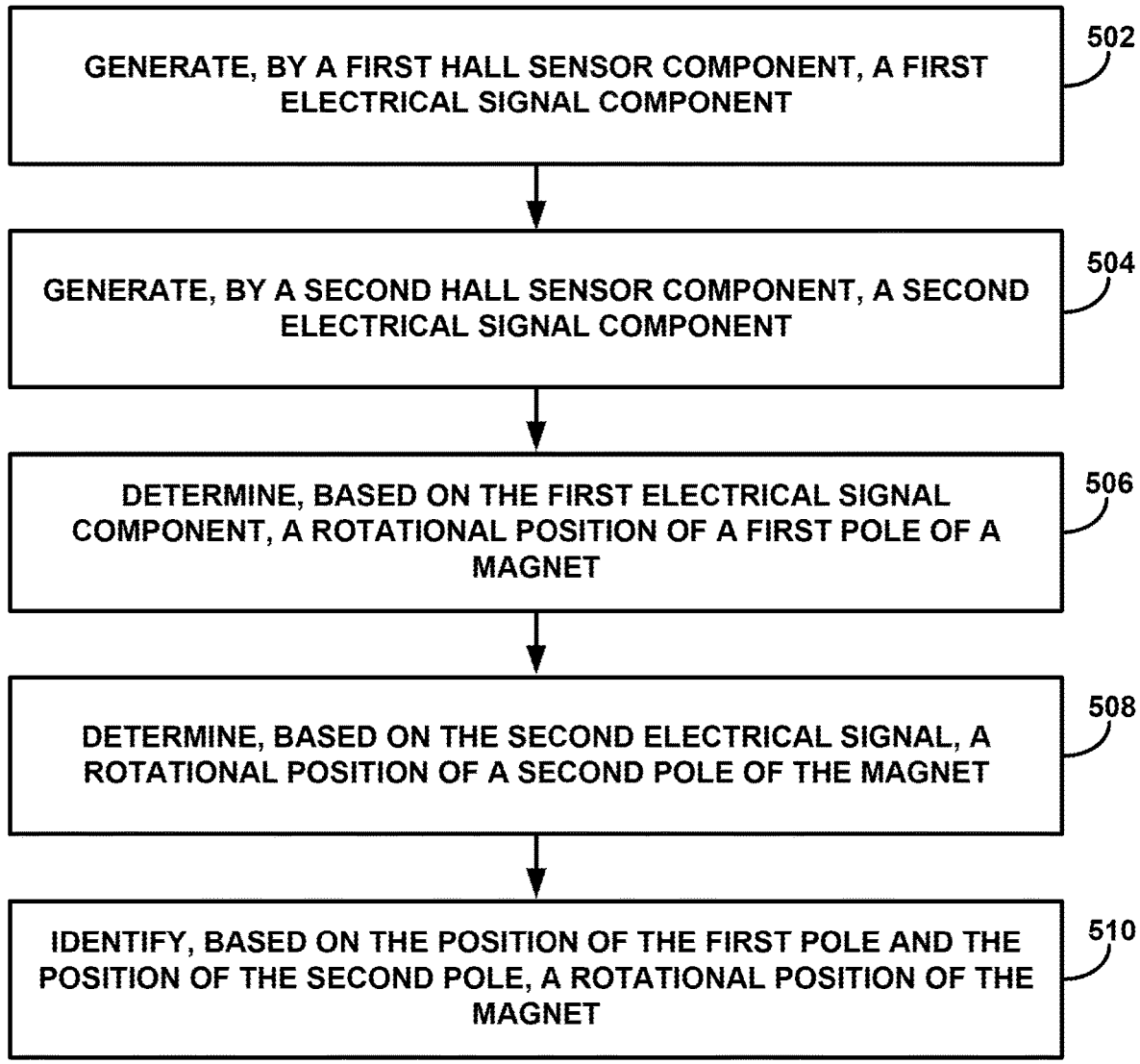
FIG. 5 is a flow diagram illustrating an example operation for identifying a rotational position of a dial based on a determined rotational position of a magnet, in accordance with one or more techniques described herein.

FIG. 5 is a flow diagram illustrating an example operation for identifying a rotational position of a dial based on a determined rotational position of a magnet, in accordance with one or more techniques described herein. FIG. 5 is described with respect to HVAC controller 120 of FIGS. 1-2. However, the techniques of FIG. 5 may be performed by different components of HVAC controller 120 or by additional or alternative devices or systems.

A first Hall effect sensor component of Hall effect sensor 144 is configured to generate a first electrical signal component (502). The first electrical signal component may indicate a location of a first pole of magnet 136 relative to Hall effect sensor 144. A second Hall effect sensor component of Hall effect sensor 144 is configured to generate a second electrical signal component (504). The second electrical signal component may indicate a location of a second pole of magnet 136 relative to Hall effect sensor 144. Processing circuitry 122 may determine, based on the first electrical signal component, a position of the first pole of magnet 136 (506) and processing circuitry 122 may determine, based on the second electrical signal component, a position of the second pole of magnet 136 (508). In some examples, the position of the first pole represents a position of the first pole relative to Hall effect sensor 144 and the position of the second pole represents a position of the second pole relative to Hall effect sensor 144. Processing circuitry 122 may identify, based on the position of the first pole and the position of the second pole, a rotational position of magnet 136 (510).

In one or more examples, the systems described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors within the accelerometer or communicatively coupled to the accelerometer. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some respects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

The following numbered examples may demonstrate one or more aspects of the disclosure.

Example 1. A device for controlling one or more heating, ventilation, and air conditioning (HVAC) components, the device comprising: a first rotatable part; a second rotatable part configured to engage with the first rotatable part, wherein a rotation of the first rotatable part causes the second rotatable part to rotate; a magnet located on the second rotatable part, wherein the magnet rotates with the second rotatable part; a sensor configured to generate an electrical signal which indicates a rotational position of the magnet; and processing circuitry. The processing circuitry is configured to: receive, from the sensor, the electrical signal which indicates the rotational position of the magnet; and change one or more parameters based on a change in the rotational position of the magnet.

Example 2. The device of example 1, wherein to change the one or more parameters, the processing circuitry is configured to change a temperature set point based on the change in the rotational position of the magnet.

Example 3. The device of any of examples 1-2, wherein the first rotatable part comprises a first gear including a first set of teeth, wherein the second rotatable part comprises a second gear comprising a second set of teeth, and wherein the first set of teeth are partially interleaved with the second set of teeth so that as the first gear rotates, the second gear also rotates.

Example 4. The device of any of examples 1-3, wherein the first rotatable part represents a dial, and wherein the processing circuitry is further configured to: determine, based on the electrical signal, the change in the rotational position of the magnet, wherein the change in the rotational position of the magnet corresponds to a change in a rotational position of the second rotatable part, and wherein a change in the rotational position of the second rotatable part corresponds to a change in a rotational position of the first rotatable part; and determine the change in the one or more parameters based on the change in the rotational position of the magnet so that the change in the one or more parameters reflects the change in the rotational position of the first rotatable part, wherein the change in the rotational position of the first rotatable part represents a user rotation of the dial.

Example 5. The device of any of examples 1-4, wherein the sensor comprises a first hall effect sensor and a second hall effect sensor, and wherein to generate the electrical signal, the sensor is configured to: generate, by the first hall effect sensor, a first electrical signal component; and generate, by the second hall effect sensor, a second electrical signal component, wherein the first electrical signal component and the second electrical signal component indicate the rotational position of the magnet.

Example 6. The device of example 5, wherein the processing circuitry is configured to: identify a value of the first electrical signal component; identify a value of the second electrical signal component; determine a difference between the value of the first electrical signal component and the value of the second electrical signal; and determine the rotational position of the magnet based on the value of the first electrical signal component, the value of the second electrical signal component, and the difference between the value of the first electrical signal component and the value of the second electrical signal component.

Example 7. The device of example 6, wherein the magnet comprises a pair of poles including a first pole and a second pole, wherein to generate the first electrical signal component, the first hall effect sensor is configured to generate the first electrical signal component based the first pole, and wherein to generate the second electrical signal component, the second hall effect sensor is configured to generate the second electrical signal component based on the second pole.

Example 8. The device of example 7, wherein the sensor is displaced from a center of the magnet by a distance, wherein a center of the sensor and the center of the magnet are located on a sensor axis, wherein the first hall effect sensor is configured to: generate the first electrical signal component to indicate a displacement of the first pole from the sensor axis, and wherein the second hall effect sensor is configured to: generate the second electrical signal component to indicate a displacement of the second pole from the sensor axis.

Example 9. The device of any of examples 1-8, wherein the processing circuitry is further configured to: determine, based on the electrical signal, a first time in which the magnet begins to rotate; and change the one or more parameters based on a first rotational position of the magnet at the first time in which the magnet begins to rotate.

Example 10. The device of example 9, wherein the processing circuitry is further configured to: identify, based on the electrical signal, the first rotational position of the magnet at the first time in which the magnet begins to rotate; determine, based on the electrical signal, a second time in which the magnet stops rotating, wherein the second time is after the first time; identify, based on the electrical signal, the second rotational position of the magnet at the second time in which the magnet stops rotating; calculate a total amount of rotation of the magnet from the first time to the second time based on the first rotational position, the second rotational position, and a number of full rotations of the magnet; and change the one or more parameters based on the total amount of rotation of the magnet.

Example 11. A method for controlling one or more heating, ventilation, and air conditioning (HVAC) components, the method comprising generating, by a sensor of a device configured to control the one or more HVAC components, an electrical signal which indicates the rotational position of a magnet, wherein the device comprises: a first rotatable part; a second rotatable part configured to engage with the first rotatable part, wherein a rotation of the first rotatable part causes the second rotatable part to rotate; the magnet located on the second rotatable part, wherein the magnet rotates with the second rotatable part; the sensor; and processing circuitry. The method further comprises receiving, by the processing circuitry from the sensor, the electrical signal which indicates the rotational position of the magnet; and changing, by the processing circuitry, one or more parameters based on a change in the rotational position of the magnet.

Example 12. The method of example 11, wherein changing the one or more parameters comprises changing, by the processing circuitry, a temperature set point based on the change in the rotational position of the magnet.

Example 13. The method of any of examples 11-12, wherein the first rotatable part represents a dial, and wherein the method further comprises: processing circuitry is further configured to: determining, by the processing circuitry based on the electrical signal, the change in the rotational position of the magnet, wherein the change in the rotational position of the magnet corresponds to a change in a rotational position of the second rotatable part, and wherein a change in the rotational position of the second rotatable part corresponds to a change in a rotational position of the first rotatable part; and determining, by the processing circuitry, the change in the one or more parameters based on the change in the rotational position of the magnet so that the change in the one or more parameters reflects the change in the rotational position of the first rotatable part, wherein the change in the rotational position of the first rotatable part represents a user rotation of the dial.

Example 14. The method of any of examples 11-13, wherein the sensor comprises a first hall effect sensor and a second hall effect sensor, and wherein generating the electrical signal comprises: generating, by the first hall effect sensor, a first electrical signal component; and generating, by the second hall effect sensor, a second electrical signal component, wherein the first electrical signal component and the second electrical signal component indicate the rotational position of the magnet.

Example 15. The method example 14, further comprising: identifying, by the processing circuitry, a value of the first electrical signal component; identifying, by the processing circuitry, a value of the second electrical signal component; determining, by the processing circuitry, a difference between the value of the first electrical signal component and the value of the second electrical signal; and determining, by the processing circuitry, the rotational position of the magnet based on the value of the first electrical signal component, the value of the second electrical signal component, and the difference between the value of the first electrical signal component and the value of the second electrical signal component.

Example 16. The method example 15, wherein the magnet comprises a pair of poles including a first pole and a second pole, wherein generating the first electrical signal component comprises generating, by the first hall effect sensor, the first electrical signal component based the first pole, and wherein generating the second electrical signal component comprises generating, by the second hall effect sensor, the second electrical signal component based on the second pole.

Example 17. The method example 16, wherein the sensor is displaced from a center of the magnet by a distance, wherein a center of the sensor and the center of the magnet are located on a sensor axis, and wherein the method further comprises: generating, by the first hall effect sensor, the first electrical signal component to indicate a displacement of the first pole from the sensor axis; and generating, by the second hall effect sensor, the second electrical signal component to indicate a displacement of the second pole from the sensor axis.

Example 18. The method of any of examples 11-17, further comprising: determining, by the processing circuitry based on the electrical signal, a first time in which the magnet begins to rotate; and changing, by the processing circuitry, the one or more parameters based on a first rotational position of the magnet at the first time in which the magnet begins to rotate.

Example 19. The method of example 18, further comprising: identifying, by the processing circuitry based on the electrical signal, the first rotational position of the magnet at the first time in which the magnet begins to rotate; determining, by the processing circuitry based on the electrical signal, a second time in which the magnet stops rotating, wherein the second time is after the first time; identifying, by the processing circuitry based on the electrical signal, the second rotational position of the magnet at the second time in which the magnet stops rotating; calculating, by the processing circuitry, a total amount of rotation of the magnet from the first time to the second time based on the first rotational position, the second rotational position, and a number of full rotations of the magnet; and changing, by the processing circuitry, the one or more parameters based on the total amount of rotation of the magnet.

Example 20. A system comprising: a device comprising: a first rotatable part; a second rotatable part configured to engage with the first rotatable part, wherein a rotation of the first rotatable part causes the second rotatable part to rotate; a magnet located on the second rotatable part, wherein the magnet rotates with the second rotatable part; a sensor configured to generate an electrical signal which indicates a rotational position of the magnet; and processing circuitry. The processing circuitry is configured to: receive, from the sensor, the electrical signal which indicates the rotational position of the magnet; and change one or more parameters based on a change in the rotational position of the magnet. The system further comprises one or more heating, ventilation, and air conditioning (HVAC) components configured to regulate an environment in an area of a building based on the one or more parameters.

Various examples of the disclosure have been described. These and other examples are within the scope of the following claims.

What is claimed is:

1. A device for controlling one or more heating, ventilation, and air conditioning (HVAC) components, the device comprising:
   a first rotatable part;
   a second rotatable part configured to engage with the first rotatable part,
     wherein a rotation of the first rotatable part causes the second rotatable part to rotate;
   a magnet located on the second rotatable part,
     wherein the magnet rotates with the second rotatable part;
   a sensor configured to generate an electrical signal which indicates a rotational position of the magnet;
     wherein the sensor comprises a first hall effect sensor and a second hall effect sensor, and
     wherein to generate the electrical signal, the sensor is configured to:
       generate, by the first hall effect sensor, a first electrical signal component; and
       generate, by the second hall effect sensor, a second electrical signal component,
         wherein the first electrical signal component and the second electrical signal component indicate the rotational position of the magnet; and
   processing circuitry configured to:
     receive, from the sensor, the electrical signal which indicates the rotational position of the magnet;
     change one or more parameters based on a change in the rotational position of the magnet;
     identify a value of the first electrical signal component;

identify a value of the second electrical signal component; and determine the rotational position of the magnet based on the value of the first electrical signal component and the value of the second electrical signal component.

2. The device of claim 1, wherein to change the one or more parameters, the processing circuitry is configured to change a temperature set point based on the change in the rotational position of the magnet.

3. The device of claim 1,
wherein the first rotatable part comprises a first gear including a first set of teeth,
wherein the second rotatable part comprises a second gear comprising a second set of teeth, and
wherein the first set of teeth are partially interleaved with the second set of teeth so that as the first gear rotates, the second gear also rotates.

4. The device of claim 1, wherein the first rotatable part represents a dial, and wherein the processing circuitry is further configured to:
determine, based on the electrical signal, the change in the rotational position of the magnet, wherein the change in the rotational position of the magnet corresponds to a change in a rotational position of the second rotatable part, and wherein a change in the rotational position of the second rotatable part corresponds to a change in a rotational position of the first rotatable part; and
determine the change in the one or more parameters based on the change in the rotational position of the magnet so that the change in the one or more parameters reflects the change in the rotational position of the first rotatable part, wherein the change in the rotational position of the first rotatable part represents a user rotation of the dial.

5. The device of claim 1, wherein the magnet comprises a pair of poles including a first pole and a second pole,
wherein to generate the first electrical signal component, the first hall effect sensor is configured to generate the first electrical signal component based the first pole, and
wherein to generate the second electrical signal component, the second hall effect sensor is configured to generate the second electrical signal component based on the second pole.

6. The device of claim 5, wherein the sensor is displaced from a center of the magnet by a distance, wherein a center of the sensor and the center of the magnet are located on a sensor axis, wherein the first hall effect sensor is configured to:
generate the first electrical signal component to indicate a displacement of the first pole from the sensor axis, and
wherein the second hall effect sensor is configured to:
generate the second electrical signal component to indicate a displacement of the second pole from the sensor axis.

7. The device of claim 1, wherein the processing circuitry is further configured to: determine, based on the electrical signal, a first time in which the magnet begins to rotate; and
change the one or more parameters based on a first rotational position of the magnet at the first time in which the magnet begins to rotate.

8. The device of claim 7, wherein the processing circuitry is further configured to:
identify, based on the electrical signal, the first rotational position of the magnet at the first time in which the magnet begins to rotate;

determine, based on the electrical signal, a second time in which the magnet stops rotating, wherein the second time is after the first time;
identify, based on the electrical signal, the second rotational position of the magnet at the second time in which the magnet stops rotating;
calculate a total amount of rotation of the magnet from the first time to the second time based on the first rotational position, the second rotational position, and a number of full rotations of the magnet; and
change the one or more parameters based on the total amount of rotation of the magnet.

9. A method for controlling one or more heating, ventilation, and air conditioning (HVAC) components, the method comprising:
generating, by a sensor of a device configured to control the one or more HVAC components, an electrical signal which indicates the rotational position of a magnet, wherein the device comprises:
a first rotatable part;
a second rotatable part configured to engage with the first rotatable part, wherein a rotation of the first rotatable part causes the second rotatable part to rotate;
the magnet located on the second rotatable part, wherein the magnet rotates with the second rotatable part;
the sensor;
wherein the sensor comprises a first hall effect sensor and a second hall effect sensor; and
processing circuitry;
generating, by the first hall effect sensor, a first electrical signal component;
generating, by the second hall effect sensor, a second electrical signal component;
receiving, by the processing circuitry from the sensor, the electrical signal which indicates the rotational position of the magnet;
changing, by the processing circuitry, one or more parameters based on a change in the rotational position of the magnet;
identifying, by the processing circuitry, a value of the first electrical signal component;
identifying, by the processing circuitry, a value of the second electrical signal component; and
determining, by the processing circuitry, the rotational position of the magnet based on the value of the first electrical signal component and the value of the second electrical signal component.

10. The method of claim 9, wherein changing the one or more parameters comprises changing, by the processing circuitry, a temperature set point based on the change in the rotational position of the magnet.

11. The method of claim 9, wherein the first rotatable part represents a dial, and wherein the method further comprises:
processing circuitry is further configured to:
determining, by the processing circuitry based on the electrical signal, the change in the rotational position of the magnet, wherein the change in the rotational position of the magnet corresponds to a change in a rotational position of the second rotatable part, and wherein a change in the rotational position of the second rotatable part corresponds to a change in a rotational position of the first rotatable part; and
determining, by the processing circuitry, the change in the one or more parameters based on the change in the rotational position of the magnet so that the change in the one or more parameters reflects the change in the rotational position of the first rotatable part, wherein the change in the rotational position of the first rotatable part represents a user rotation of the dial.

12. The method of claim 9, wherein the magnet comprises a pair of poles including a first pole and a second pole,
wherein generating the first electrical signal component comprises generating, by the first hall effect sensor, the first electrical signal component based the first pole, and
wherein generating the second electrical signal component comprises generating, by the second hall effect sensor, the second electrical signal component based on the second pole.

13. The method of claim 12, wherein the sensor is displaced from a center of the magnet by a distance, wherein a center of the sensor and the center of the magnet are located on a sensor axis, and wherein the method further comprises:
generating, by the first hall effect sensor, the first electrical signal component to indicate a displacement of the first pole from the sensor axis; and
generating, by the second hall effect sensor, the second electrical signal component to indicate a displacement of the second pole from the sensor axis.

14. The method of claim 9, further comprising:
determining, by the processing circuitry based on the electrical signal, a first time in which the magnet begins to rotate; and
changing, by the processing circuitry, the one or more parameters based on a first rotational position of the magnet at the first time in which the magnet begins to rotate.

15. The method of claim 14, further comprising:
identifying, by the processing circuitry based on the electrical signal, the first rotational position of the magnet at the first time in which the magnet begins to rotate;
determining, by the processing circuitry based on the electrical signal, a second time in which the magnet stops rotating, wherein the second time is after the first time;
identifying, by the processing circuitry based on the electrical signal, the second rotational position of the magnet at the second time in which the magnet stops rotating; calculating, by the processing circuitry, a total amount of rotation of the magnet from the first time to the second time based on the first rotational position, the second rotational position, and a number of full rotations of the magnet; and
changing, by the processing circuitry, the one or more parameters based on the total amount of rotation of the magnet.

16. A system comprising:
a device comprising:
a first rotatable part;
a second rotatable part configured to engage with the first rotatable part,
wherein a rotation of the first rotatable part causes the second rotatable part to rotate;
a magnet located on the second rotatable part,
wherein the magnet rotates with the second rotatable part;
a sensor configured to generate an electrical signal which indicates a rotational position of the magnet;
wherein the sensor comprises a first hall effect sensor and a second hall effect sensor, and
wherein to generate the electrical signal, the sensor is configured to:
generate, by the first hall effect sensor, a first electrical signal component; and
generate, by the second hall effect sensor, a second electrical signal component,
wherein the first electrical signal component and the second electrical signal component indicate the rotational position of the magnet; and
processing circuitry configured to:
receive, from the sensor, the electrical signal which indicates the rotational position of the magnet;
change one or more parameters based on a change in the rotational position of the magnet;
identify a value of the first electrical signal component;
identify a value of the second electrical signal component; and
determine the rotational position of the magnet based on the value of the first electrical signal component and the value of the second electrical signal component; and
one or more heating, ventilation, and air conditioning (HVAC) components configured to regulate an environment in an area of a building based on the one or more parameters.

* * * * *